United States Patent
Gilmer et al.

(10) Patent No.: US 7,058,513 B2
(45) Date of Patent: Jun. 6, 2006

(54) METHOD OF SEISMIC EXPLORATION BY DISCRIMINATING HORIZONTAL AND VERTICAL SHEAR WAVES

(75) Inventors: Allen L. Gilmer, Austin, TX (US); Bob A. Hardage, Burnet, TX (US)

(73) Assignees: Vecta Technology, L.P., Dallas, TX (US); Board of Regents of the University of Texas Systems, Austin, TX (US)

(*) Notice: Subject to any disclaimer, the term of this patent is extended or adjusted under 35 U.S.C. 154(b) by 68 days.

(21) Appl. No.: 10/786,782

(22) Filed: Feb. 25, 2004

(65) Prior Publication Data

US 2005/0038606 A1 Feb. 17, 2005

Related U.S. Application Data

(63) Continuation-in-part of application No. 09/952,430, filed on Sep. 14, 2001, now Pat. No. 6,831,877, which is a continuation-in-part of application No. 09/436,453, filed on Nov. 8, 1999, now abandoned.

(51) Int. Cl.
*G01V 1/28* (2006.01)

(52) U.S. Cl. .................................................. 702/14

(58) Field of Classification Search ................. 702/14, 702/16, 17; 367/73, 74, 75
See application file for complete search history.

(56) References Cited

U.S. PATENT DOCUMENTS

| 4,803,666 | A | * | 2/1989 | Alford | 367/36 |
| 4,803,669 | A | | 2/1989 | Airhart | |
| 5,136,554 | A | * | 8/1992 | Thomsen et al. | 367/75 |
| 5,610,875 | A | * | 3/1997 | Gaiser | 367/75 |
| 5,991,695 | A | * | 11/1999 | Wang et al. | 702/14 |
| 6,005,916 | A | * | 12/1999 | Johnson et al. | 378/87 |
| 6,292,754 | B1 | * | 9/2001 | Thomsen | 702/14 |

* cited by examiner

Primary Examiner—Donald McElheny, Jr.
(74) Attorney, Agent, or Firm—Baker Botts L.L.P.

(57) ABSTRACT

The invention is a method of geophysical exploration using seismic methods. The receivers and the source are rotated to one another, such that the orthogonal excitations of the seismic source are readily differentiated. The differentiation of the differently excited energies can be accomplished in devolving the seismic events and reception of those events into a radial-tangential coordinate system for each receiver source pair. The differentiation of the differently aligned energies allows a greater insight into the volumetric study of the strata making up the prospect volume.

9 Claims, 10 Drawing Sheets

METHOD OF SEISMIC EXPLORATION BY DISCRIMINATING HORIZONTAL AND VERTICAL SHEAR WAVES

CROSS-REFERENCE TO RELATED APPLICATION

This application is a continuation-in-part of U.S. patent application Ser. No. 09/952,430, filed on Sep. 14, 2001 now U.S. Pat. No. 6,831,877, entitled "SYSTEM AND METHOD FOR DETERMINING AN AZIUMTH OF A SEISMIC ENERGY SOURCE" to Bob Hardage, et al., which is a continuation-in-part of U.S. patent application Ser. No. 09/436,453, filed on Nov. 8, 1999 now abondoned, entitled "METHOD OF SEISMIC EXPLORATION DISCRIMINATING HORIZONTAL AND VERTICAL SHEAR WAVES" to Milo Backus, et al., which is incorporated herein by reference.

TECHNICAL FIELD OF THE INVENTION

The invention is directed toward a method of geophysical exploration in which orthogonally directed seismic energies are transformed to differently oriented energies representing horizontal and vertical shear seismic energies at the seismic energy source and at each seismic receiver. The invention allows the discrimination of the vertical shear and horizontal shear energies present in the seismic energy as received by the receivers in a multidimensional geophysical array.

BACKGROUND OF THE INVENTION

Currently, most geophysical techniques dealing with multi-dimensional seismic data do not discriminate or locate seismic energies of different orientations, such as the horizontal shear energy and the vertical shear energy portions of directed seismic energy. In a typical multi-dimensional seismic survey, a multi-mode seismic energy generator may be used to generate a preponderance of one orientation of seismic energy relative to a particular orientation, then a preponderance of energies orthogonal to the first, relative to the same orientation. However, the orientation of the received seismic energies changes at each receiver due to the fact that the orientation between the seismic energy source and each receiver in a multi-dimensional seismic array is different.

Differently oriented seismic energies travel differently through the subsurface strata based upon the characteristics of the subsurface strata. Thus, if a fault plane in the strata were in more of a vertical orientation relative to the plane defined by the seismic energy source-receiver line, the different seismic energies would have a different travel characteristic. The mapping of the subsurface features could be greatly enhanced through processing of these oriented seismic energies, especially in an orientation specific to the azimuths defined by each receiver with the seismic energy source. Additionally, important rock property information can be ascertained by comparing differences and similarities of the attributes of the oriented seismic energies.

However, the processing of such data is complicated because the oriented energies are not easily discriminated into the differently oriented energies for each receiver-source azimuth. Also, the processing of these components is complicated since the orientation of the operational modes of the seismic energy source do not always correspond to the orientation of each and every receiver in the geophysical array. Many other problems and disadvantages of the prior art will be become apparent to one skilled in the art after comparing such prior art with the present invention as described herein.

SUMMARY OF THE INVENTION

Various aspects of the present invention can be found in a method of geophysical exploration. First, a seismic energy source imparts seismic energy into the earth's subsurface formations in a first mode, and then in a second mode of operation. During the activations of the seismic energy source, seismic receivers receive and either record or send to be recorded a record of the detected reflected seismic events propagated by the seismic energy source. The receivers are equipped with a plurality of geophones for detecting the reflected seismic events, and the geophones are oriented in different directions on each receiver. Thus, the receivers through the differently oriented geophones are adapted to receive differently oriented seismic energies. Additionally, an embodiment of the invention is directed to a situation where the two different orientations of the geophones on the receiver are orthogonal to one another.

The seismic energies produced by the seismic energy source in the different modes of operation are transformed to differently oriented modes of operation. The differently oriented modes of operation are then used alone with the received energies at the receivers to determine a volumetric image of the subsurface formations.

Alternatively, the reflected energies received by the receivers may be transformed into a plurality of seismic energies. The different orientations of the geophones on a receiver can be used to define a received coordinate system, and the received seismic energies are transformed into a different coordinate system for further processing.

In another embodiment, the plurality of seismic energies received by the receivers can be transformed into seismic energies corresponding to radial and tangential seismic energies relative to an azimuth defined by a particular receiver receiving and detecting the imparted seismic energies and the seismic energy source. Thus, a coordinate system for each receiver is defined for the received energies based on the azimuth between the particular receiver and the seismic energy source.

Alternatively, the seismic energy source may impart seismic energies by operating the seismic energy source in a plurality of directional modes, where the directional modes correspond to differently oriented types of seismic energy. Also, the seismic events at the seismic energy source may be transformed by rotating the seismic events to a radial and tangential coordinate system with respect to an azimuth defined between any receiver receiving the imparted seismic energies and the seismic energy source.

In an exemplary embodiment of the invention, the determination of the subsurface formations is performed at least in part with the data sets transformed to a radial and tangential coordinate system with respect to the seismic source.

In an another exemplary embodiment of the invention, a method of geophysical exploration comprises imparting seismic energy into the earth's subsurface formations with a seismic energy source, where the seismic energy source is excited in a first mode and in a second mode. Receivers equipped with a plurality of differently oriented geophones receive and either record or cause to be recorded data sets of seismic traces corresponding to reflections of the imparted seismic energies. The seismic receivers adapted to receive seismic energies in at least two different orientations due to the differing orientations of the geophones on each receiver. The energies produced by the seismic energy source in the first and second modes are transformed to seismic energy in a transformed first mode and energy in a transformed second mode. The energies at the receivers are discriminated into energy in a transformed first mode and energy in transformed second mode. Then a volumetric image is determined of the subsurface formations based on the data set of seismic energies as transformed.

Other aspects of the present invention will become apparent with further reference to the drawings and specifications that follow.

DETAILED DESCRIPTION OF THE INVENTION

Figure 1:
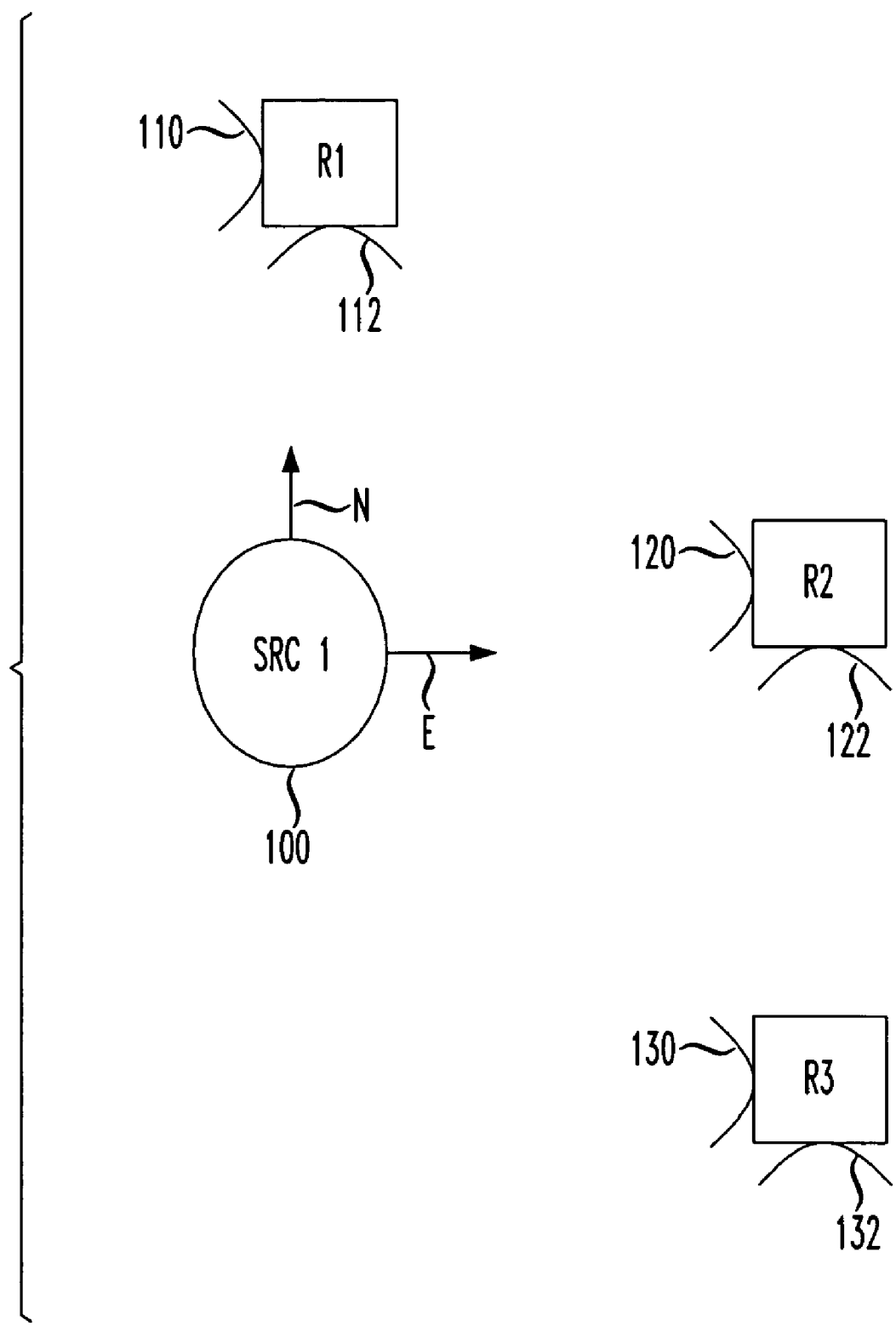
FIG. 1 is a schematic diagram of a typical volumetric seismic survey.

FIG. 1 is a schematic diagram of a typical volumetric seismic survey. A seismic energy source 1 is capable of producing differently oriented modes of seismic energies, as noted by the arrows "N" and "E" respectively. Thus, in one mode the seismic energy source 1 imparts seismic energy in a direction consistent with arrow N. In another mode, the seismic energy source 1 imparts seismic energy in a direction consistent with arrow E. In FIG. 1, the directions N and E are orthogonal, as is commonly practiced. However, the different directions of operation, or the modes of operation, need not be orthogonal.

The seismic energy imparted by the seismic energy source 1 into the subsurface formations of the earth contains seismic energy comprising energies of various orientations. Mainly these oriented seismic energies are known as vertical shear waves horizontal shear waves, and compression waves.

Various seismic receivers R1, R2, and R3 are laid about the seismic energy source 1 in order to received and record the reflected seismic energies as propagated through the earth's surface from the seismic energy source 1. The receiver R1 contains a geophone 110 and a geophone 112. The geophones 110 and 112 are typically arranged in an orthogonal relationship to one another, however, they need not be. Thus, the geophones 110 and 112 are suited for obtaining information retarding the different orientations of the received reflected seismic energy. Correspondingly, a receiver R2 contains a geophone 120 and another geophone 122. The geophones 120 and 122 are also arranged such that they are suited for picking up differently oriented components of received seismic events, as originated by the seismic source 1, as transmitted through the earth's subsurface formation, and ultimately reflected by the earth's subsurface formations to the receiver.

The seismic energies produced by the seismic energy source 1 is reflected and received by the receivers R1, R2, R3, and R4 through the various geophones contained within and disposed about them. As shown, a typical volumetric seismic survey contains numerous receivers arrayed about the seismic energy source.

Figure 2:
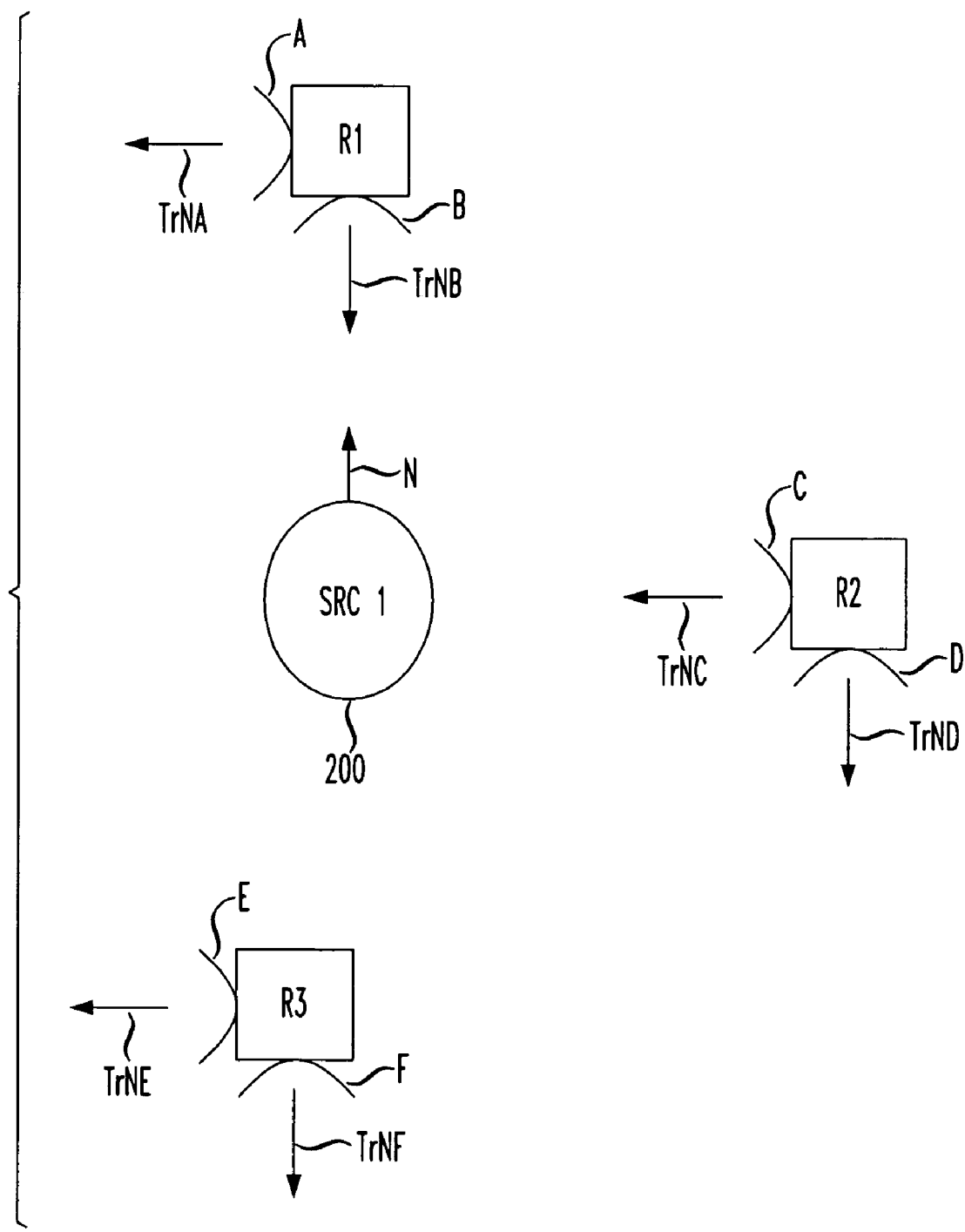
FIG. 2 is a diagram detailing the typical operation of a seismic energy source and several receivers during operation in a volumetric seismic survey.

FIG. 2 is a diagram detailing the typical operation of a seismic energy source and several receivers during operation in a volumetric seismic survey. First, a seismic energy source 200 is operated in a first mode, as indicated by the arrow N. This indicates that the seismic energy source 200 imparts seismic energy in a mode parallel and/or antiparallel to the direction indicated by the arrow N. This mode of operation of the seismic energy source is one that produces a preponderance of energy corresponding to a vertical shear for a receiver R1, and corresponding to a horizontal shear for a receiver R2.

The seismic energy propagates through the earth's surface wherein it is reflected by subsurface formations, and proceeds back towards the surface. There, the receivers R1 and R2 detect the reflected seismic energy. The receivers detect the reflected energy and produce a signal corresponding to the detected reflected energy. This signal is recorded or stored, either by the receiver itself or the signal may be transmitted to a seismic recorder (not shown) for storage and later processing.

The receiver R1 is positioned to record these reflected seismic energies. The receiver R1 comprises a geophone A and a geophone B. The reflected seismic energies are captured by the geophones A and B and are subsequently recorded as traces in a data set.

The reflected seismic energy as initiated by the seismic energy source in the N direction and detected by the geophone A is illustrated as TrNA. The reflected seismic energy as initiated by the seismic energy source in the N direction and detected by the geophone B is illustrated as TrNB. These detected events are recorded as traces TrNA and TrNB.

Correspondingly, the receiver R2 is positioned to record these same reflected seismic energies. The receiver R2 comprises a geophone C and geophone D. The reflected energy is captured by the geophone C and D and are subsequently recorded as traces in a data set. The traces detected and recorded by the geophone C is illustrated as TrNC, and the reflected energy as captured by the geophone D is indicated in the diagram as TrND. The subscripts TrNC and TrND refer to the corresponding traces of the geophone C and D when the seismic energy source 200 is operated in the mode as indicated by arrow N.

However, a receiver R3 is positioned in a non-parallel and non-perpendicular azimuth from the seismic energy source 200 with respect to the seismic energy source's 200 orientation of the its modes of operation. The receiver R3 comprises a geophone E and a geophone F. The reflected seismic energy is detected by the geophone E and F. These detections are subsequently recorded as traces in a data set.

The traces captured by the geophone E are illustrated as TrNE. Correspondingly, the reflected seismic energy as detected by the geophone F is indicated in the diagram as TrNF.

As indicated, the receiver R3 does not detect the reflected seismic energy in a manner that lends itself to discriminating between the orientations of energy in the modes of operation of the seismic source 200. The seismic energy source 200 does not operate in any mode that corresponds to a horizontal or vertical shear to the receiver R3. This is because the receiver's R3 geophones may or may not be aligned in parallel or in perpendicular orientations to the azimuth defined between the seismic energy source 200 and the receiver R3.

Figure 3:
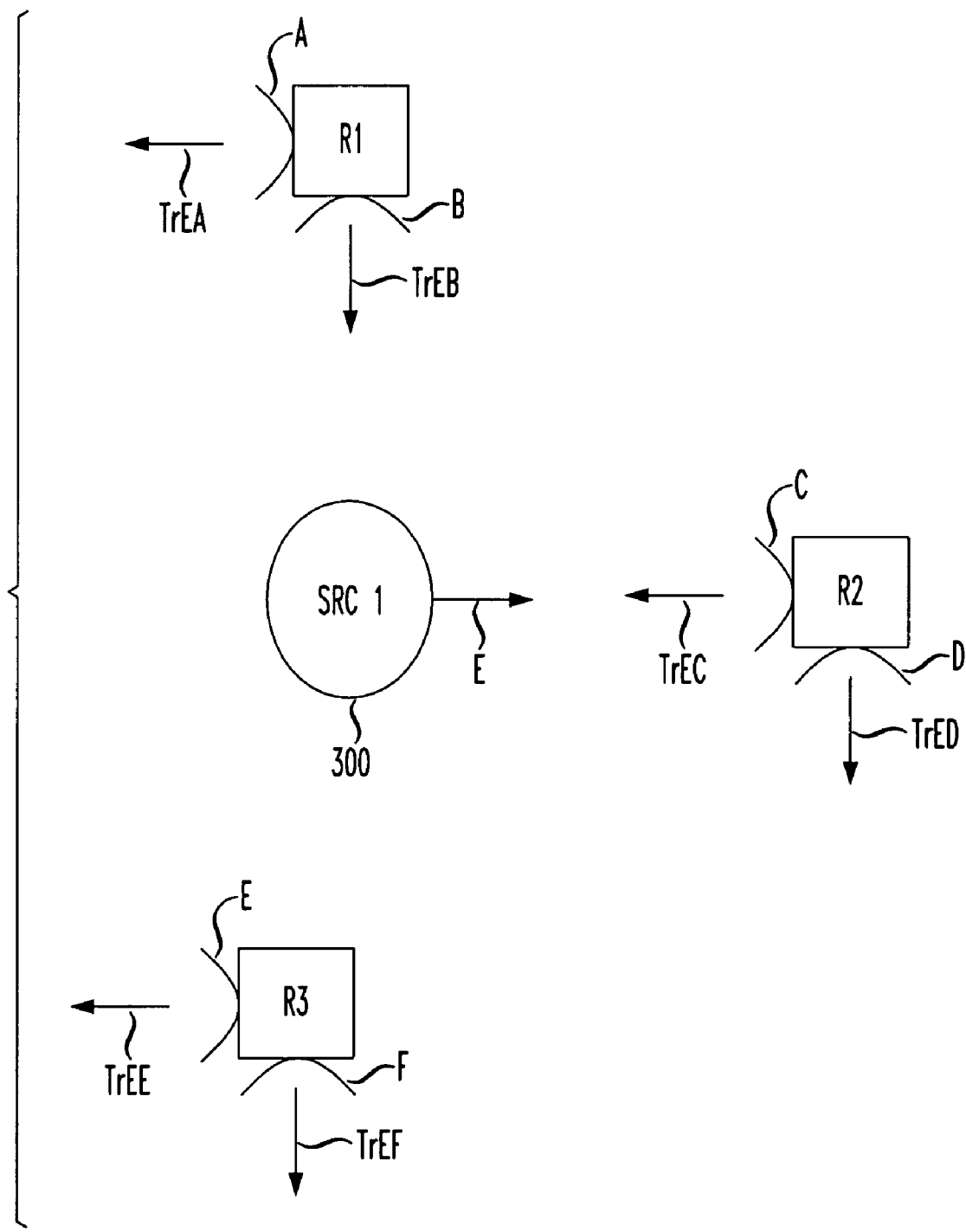
FIG. 3 is a diagram showing the operation of the seismic energy sources and receivers of FIG. 2 when the seismic energy source is operated in another directional mode of operation.

FIG. 3 is a diagram showing the operation of the seismic energy sources and receivers of FIG. 2 when the seismic energy source is operated in another directional mode of operation. After the operation of the seismic energy source 200 in the first mode, as diagramed in FIG. 2, the seismic energy source 200 is operated in a second directional mode, as indicated by the arrow E. This indicates that the seismic energy source 200 imparts seismic energy in a mode parallel and/or antiparallel to the direction indicated by the arrow E. This mode of operation of the seismic energy source is one that produces a preponderance of energy corresponding to a horizontal shear for a receiver R1, and corresponding to a vertical shear for a receiver R2.

The seismic energy again travels through the earth's surface where it is reflected by subsurface formations and proceeds back towards the surface. There, the receivers R1 and R2 detect the reflected energy. The receivers detect the reflected energy and record a signal corresponding to the capture of the reflected energy. This signal is stored either by the receiver itself, or may be transmitted to a seismic recorder for storage and later processing.

The reflected energy is detected by the receiver R1 by the geophones A and B and is subsequently recorded as traces in a data set. The energy detected by the geophone A is illustrated as TrEA, and the reflected energy as captured by the geophone B is indicated in the diagram as TrEB. The subscripts TrEA and TrEB also refer to the corresponding traces of the geophones A and B when the seismic energy source 200 is operated in the mode as indicated by arrow E.

Correspondingly, the reflected energy is captured by the geophone C and D on the receiver R2 and is subsequently recorded as traces in a data set. The traces detected and recorded by the geophone C is illustrated as TrEC, and the reflected energy as detected and recorded by the geophone D is indicated in the diagram as TrED. The subscripts. TrEC and RED refer to the corresponding traces of the geophones C and D when the seismic energy source 200 is operated in the mode as indicated by arrow E.

However, a receiver R3 is positioned in a non-parallel and non-perpendicular orientation from the seismic energy source 200 with respect to the seismic energy source's 200 modes of operation. The receiver R3 comprises a geophone E and a geophone F. The reflected energies are captured by the geophones E and F and are subsequently recorded as traces in a data set. The traces detected and recorded by the geophone E are illustrated as TrEE. Correspondingly, the reflected energy as detected and recorded by the geophone F is indicated in the diagram as TrEF.

As indicated, the receiver R3 does not detect the reflected seismic energy in a manner that does lends itself to discriminating between the parallel and perpendicular components of the seismic energy source 200, relative to its orientation to the seismic energy source 200. The seismic energy Source does not operate in modes that correspond to these component, and the receiver's geophones may or may not be aligned in parallel or in perpendicular orientations to the azimuth defined between the seismic energy source 200 and the receiver R3.

As indicated, the geophones contained on a receiver are typically oriented to capture orthogonally oriented seismic energy. However, the geophones may be aligned in any orientation with respect to one another. Further, the receiver may contain more than two geophones for greater discrimination of the oriented seismic energy.

FIG. 4 is a diagram of an embodiment of the invention wherein the receiver and seismic energy source operations are transformed into a coordinate system that easily discriminates between orthogonal components of energies. FIG. 4 shows the transformation of the operation of a seismic energy source 400, as described in FIGS. 2 and 3, into radial and tangential coordinates for processing, relative to the orientation between the seismic energy source 400 and any arbitrary receiver 410. The operation of the seismic energy source 400 in the first coordinate system, as shown and described in FIGS. 2 and 3, is transformed to a coordinate orientation where the modes of operation of the seismic energy source 400 are in radial and tangential form with respect to a receiver 410. Thus, the transformed modes of operation for the seismic energy source 400 are denoted as T' and R'. This transformation is accomplished by rotating the receiver and the seismic energy source in an orientation that reflects the operation of these components in orthogonal relationship to one another. In this embodiment, the operations of the functional seismic components 400 and 410 are rotated relative to the angle between them. Thus, the operations of both components may be viewed in a radial and transverse orientation to one another.

Figure 4A:
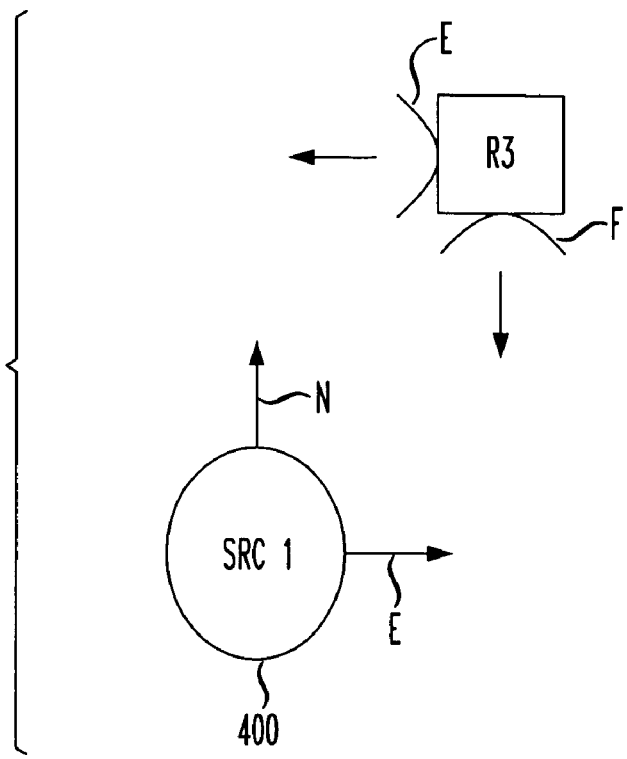
FIG. 4 is a diagram of an embodiment of the invention of the seismic energy source and a receiver of FIGS. 2 and 3.
Figure 4B:
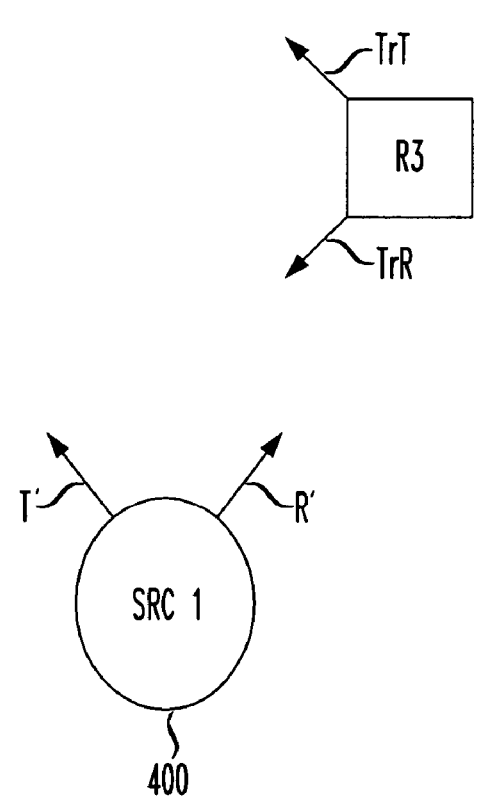

The energy components N and E, FIG. 4a, are transformed into the energy operational components T' and R', FIG. 4b. Similarly, the traces received at the geophones E and F at the receiver 410 are transformed into the radial and tangential traces TrR and TrT, respectively. The transformation takes place for each receiver, and a transformation of the seismic event creating these traces also takes place for each receiver. These transformations allow the discrimination and/or isolation of radial and tangential orientations of energy produced by the seismic energy source 400 and the received and detected energies at each receiver.

Figure 5A:
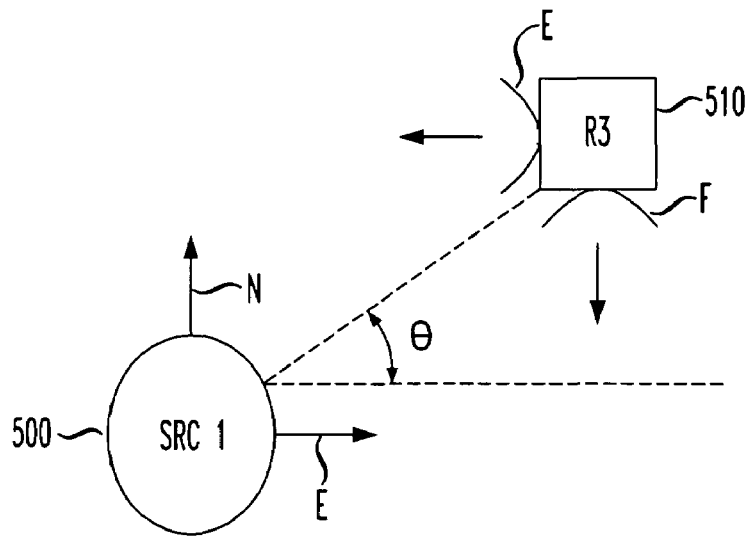
FIGS. 5a–c detail the transformation of the seismic energy source to the new coordinate system.
Figure 5B:
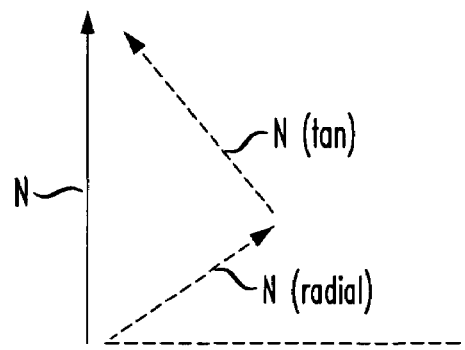
Figure 5C:
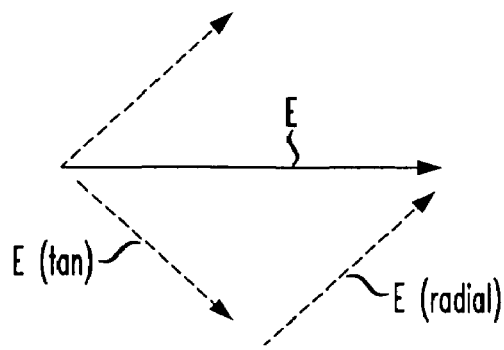

FIGS. 5a–c detail the transformation of FIG. 4 of the seismic energy source modes of operation to the new coordinate system. A seismic energy source 500 and a receiver 510 are located at an angle theta from one another. The arrows N and E denote the modes of operation of the seismic energy source 500. The new operational modes of the seismic energy source 500 are determined by accumulating the respective components of each operational mode actual operational mode. As shown in FIG. 5b, the N operational mode contains components of operation in the radial and tangential orientation of the direction between the seismic energy source 500 and the receiver 510. Similarly, in FIG. 5c the N operational mode contains components of operation in the radial and tangential orientation of the direction between the seismic energy source 500 and the receiver 510. These components are determined for each actual operational mode, and added together to produce a radial mode of operation and a tangential mode of operation relative to the receiver.

Geometrically, the radial component of the transformed operational mode may be determined by:

Radial excitation=$N \sin(theta) + E \cos(theta)$, where N and E represent the operation of the seismic energy source in physical operation. Similarly, the tangential component of the transformed operational mode may be determined by Tangential excitation=$N \cos(theta) + E \sin(theta)$, where N and E represent the physical operational modes of the seismic energy source 600.

Figure 6A:
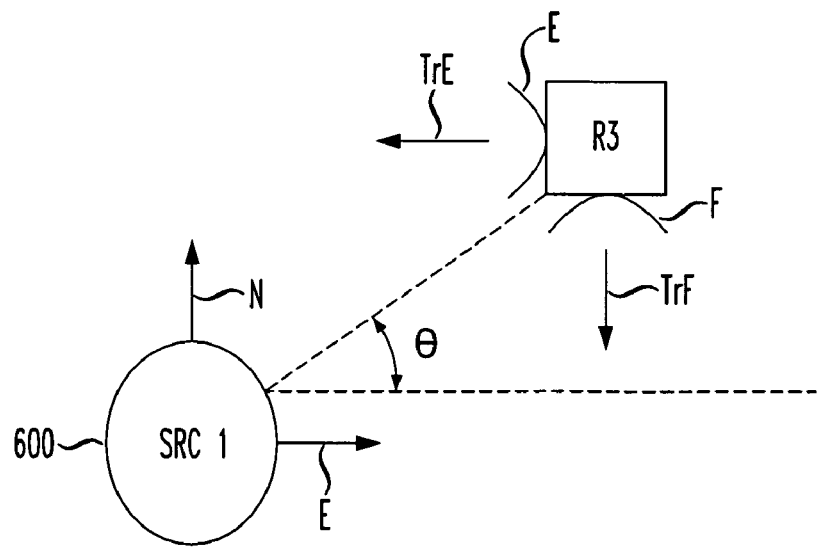
FIGS. 6a–c are diagrams detailing the determination of the transformed traces of the receiver of FIG. 4 into the new coordinate system.
Figure 6B:
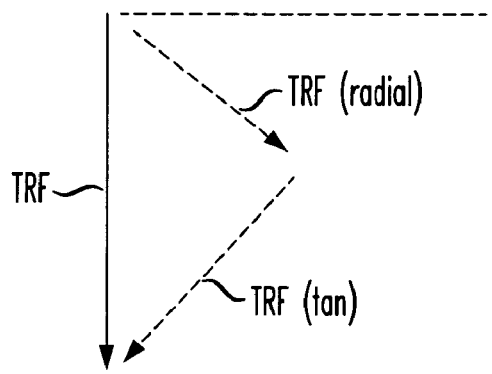
Figure 6C:
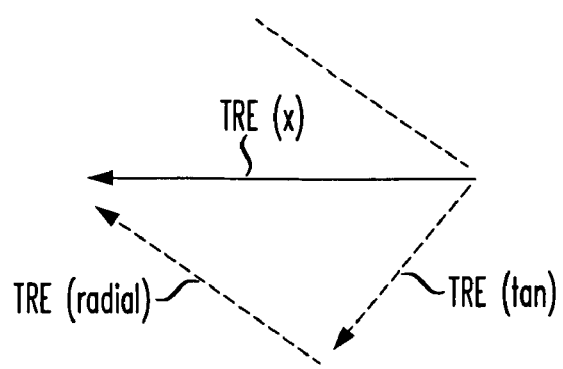

FIGS. 6A–C are diagrams detailing the determination of the received traces of the receiver of FIG. 4 into the new transformed coordinate system. The arrows TrN and TrE denote the traces of a single activation of the seismic energy source 600. New traces are determined from the received traces, and the new traces correspond to the new operational modes of the seismic energy source 600, as detailed previously.

The received traces for a single excitation of the energy source 600 are then transformed into the same coordinate system. The traces as received by the receiver 610 are determined by accumulating the respective components of each trace in the new radial-tangential coordinate system. As shown in FIG. 6b, the received trace TrN contains components in the radial and tangential orientation, the orientation determined by the angle between the seismic energy source 600 and the receiver 610.

Similarly, in FIG. 6c the received TrE trace contains components in the radial and tangential determined by the angle between the seismic energy source 600 and the receiver 610.

The corresponding components of the actual received traces in the radial and tangential orientations are summed to produce a trace in the corresponding radial or tangential orientation with respect to the seismic source 600.

Geometrically, the radial transformed trace may be determined by:

Radial trace=$TrF \sin(theta) + TrE \cos(theta)$, where TrE and TrF represent the traces received at the geophones E and F, respectively, during an excitation of the seismic source 600.

Similarly, a tangential trace may be determined by:

Tangential trace=$TrF \cos(theta) + TrE \sin(theta)$,
again, where TrE and TrF represent the traces received at the geophones E and F, respectively, during an excitation of the seismic source 600.

This process is repeated for all the receivers, such as the receivers R1 through RN, FIG. 1, for a survey. As such, the actual operational modes of the seismic energy source are deconstructed into components in the radial and transverse directions to the receiver, for each and every receiver. The traces received by a receiver are similarly transformed into a radial and tangential coordinate system defined by the inherent angle between the particular receiver and the seismic energy source. Thus, processing in a unique coordinate system for each receiver allows the discrimination of vertical shear energy and horizontal shear energy for each receiver in the survey. Processing may take place in this coordinate system throughout the entire seismic processing sequence.

Figure 7:
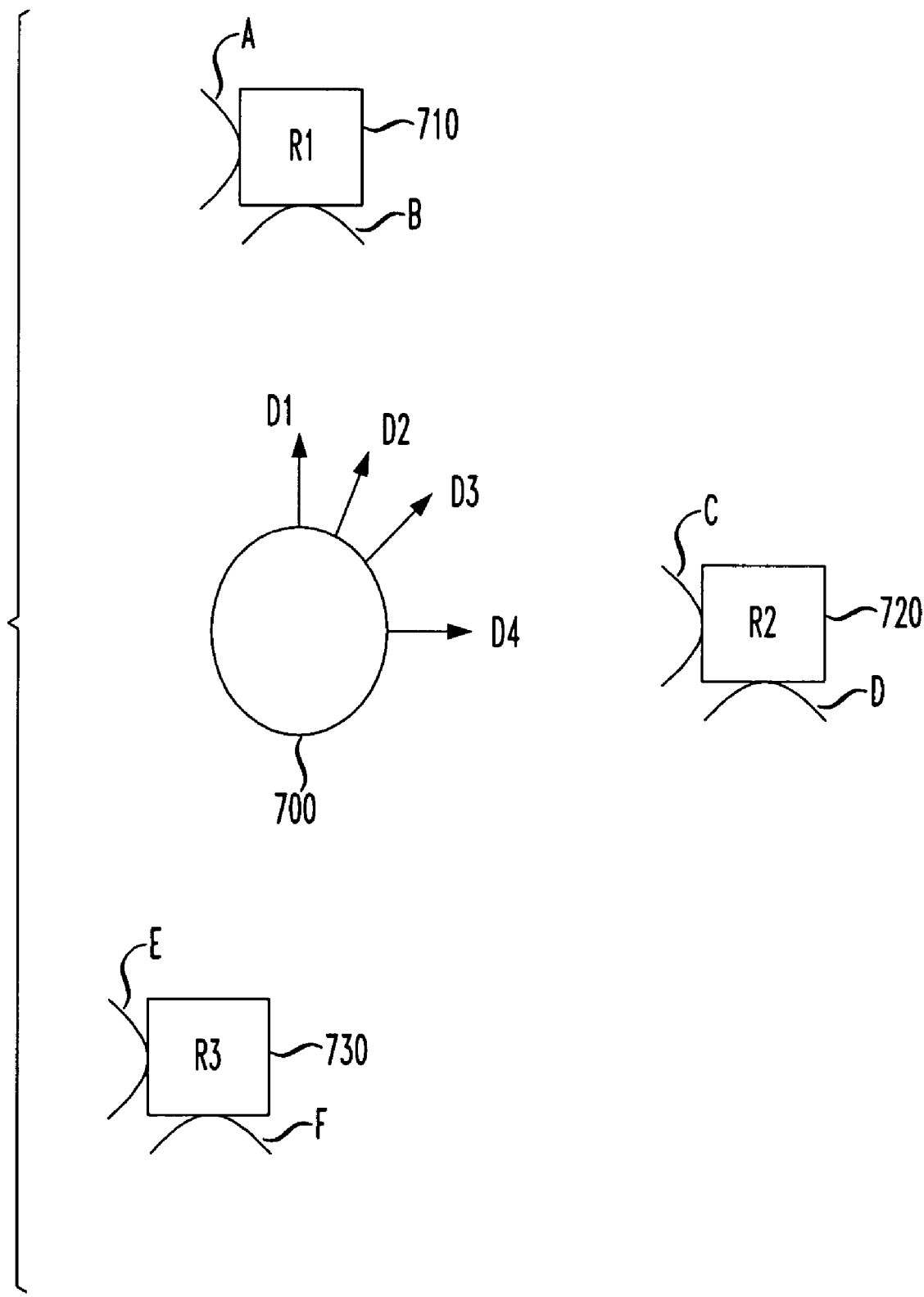
FIG. 7 is a block diagram of another embodiment of the invention of FIG. 4 wherein more than two modes of seismic energy source operation are envisioned.

FIG. 7 is a block diagram of an alternative embodiment of the invention of FIG. 4 wherein more than two modes of seismic energy source operation are envisioned. The seismic energy source 700 may be rotated to various orientations for the survey, as denoted by the arrows D1, D2, D3, and D4. Thus, the seismic energy source may contain operational modes in a number of different orientations, as well as orthogonals to those orientations. Each operation of the seismic energy source 700 in a particular mode may be recorded by the receivers 710–730. The result seismic events created by the seismic energy source 700 may be broken down into radial-tangential coordinates for each receiver. The modes of incremental angles after rotating are simply deconstructed into the constituent component parts and reconstructed in the radial tangential coordinate system. The seismic energy source 700 may sweep through a set angle in incremental steps, producing many responses in the receivers.

Additionally, using similar techniques as described above, each and every response at a receiver may be deconstructed into the components of the radial and tangential directions as defined by the angle inherent between each particular receiver and the seismic energy source 700 for each seismic event that the seismic energy source 700 produces. Additional techniques such as correlation and regression analysis may be used to further refine the distinctions between the horizontal and vertical shear components when the operational mode of the seismic energy source is very close to parallel or perpendicular to the direction to an individual receiver.

Figure 8:
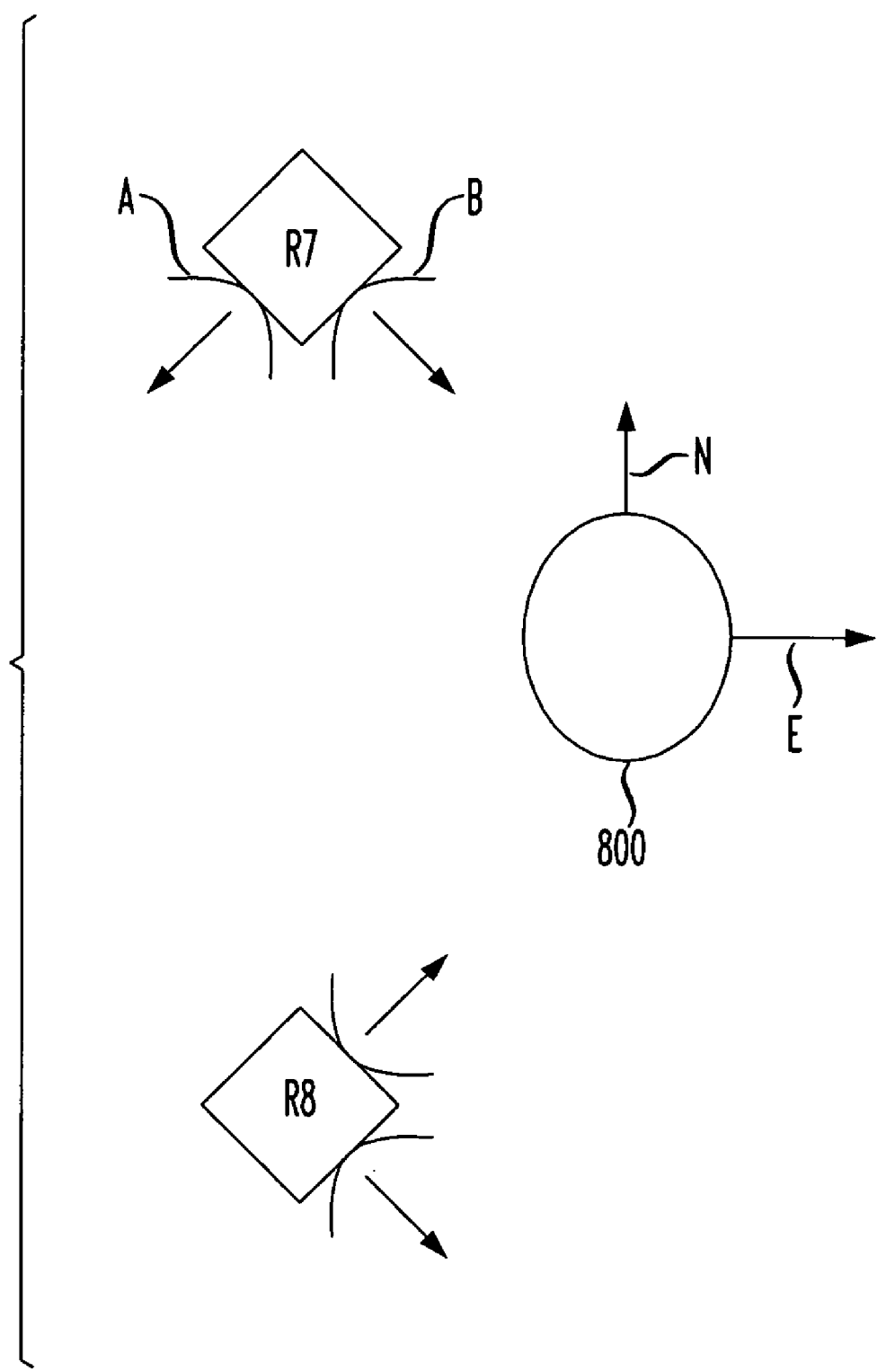
FIG. 8 is an alternative embodiment of the invention as described in FIG. 4, wherein the radial and tangential components of the traces are directly measured.

FIG. 8 is an alternative embodiment of the invention as described in FIG. 4, wherein the radial and tangential components of the traces are directly measured. A seismic energy source 800 is set in a seismic survey, and has more than one mode of operation. The transformed modes of operation of the seismic energy source 800 may be determined for each receiver as detailed before.

The receivers R7 and R8 contain geophones 872 and 874, and 882 and 884, as described earlier. The receivers are physically oriented in orientations as close to parallel and perpendicular to the seismic energy source 800 as possible. Thus, minimal transformation is needed for deconstructing and transforming the traces in the processing and post processing phases of the geophysical survey.

Figure 9:
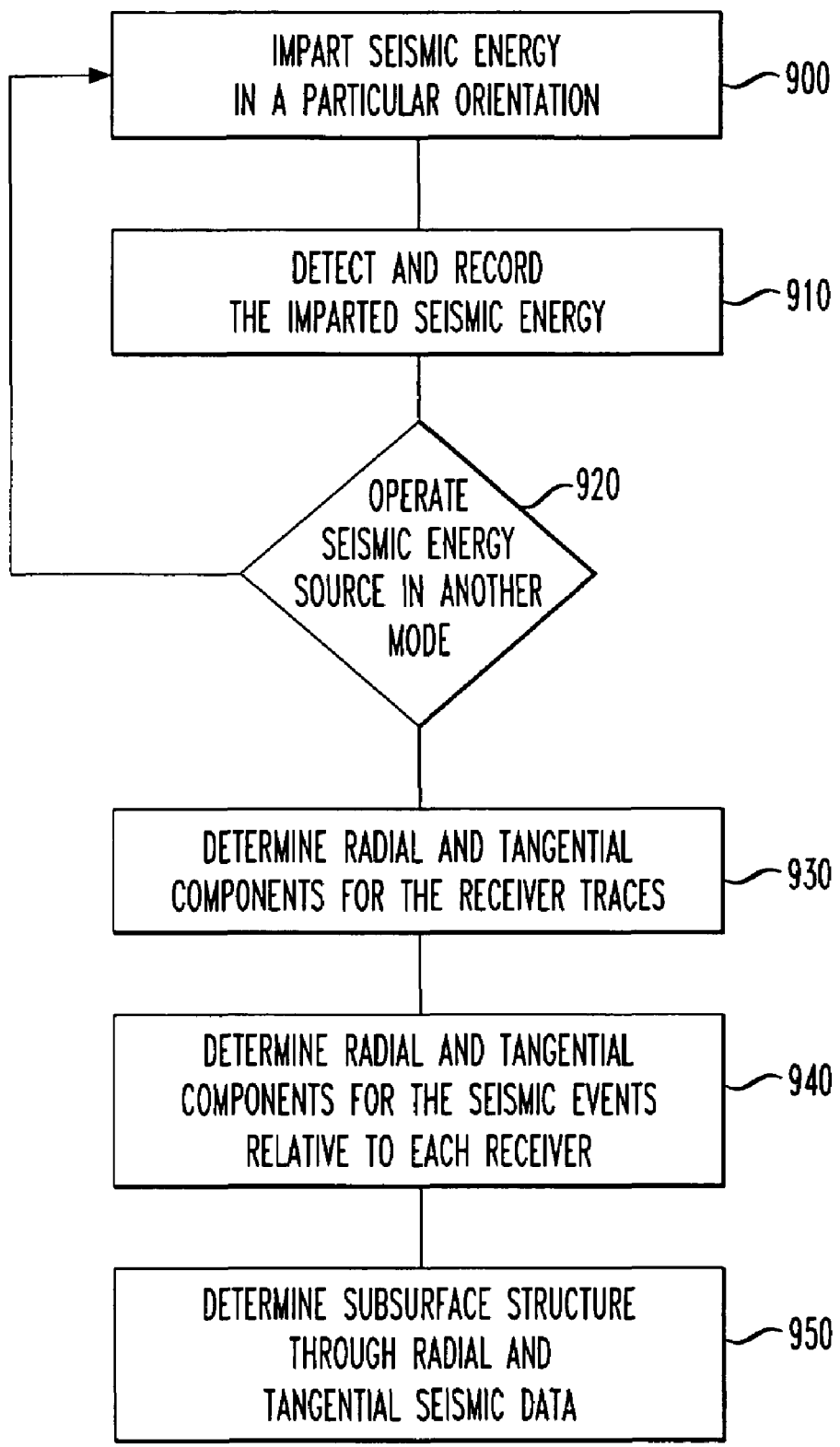
FIG. 9 is a flow diagram of practicing an embodiment of the invention of FIG. 4.

FIG. 9 is a flow diagram of practicing an embodiment of the invention of FIG. 4. In a block 900, a seismic energy source imparts seismic energy into the earth in one particular orientation. In a block 910, a plurality of geophones at a receiver detects the seismic energy originating with the seismic event initiated in block 900 and reflected from subsurface formations of the earth. This reflected energy is recorded by a seismic recording system on some media or in some electronic memory. At a block 920, a decision is made to operate the seismic energy source another time, in another oriented mode. If this is to be, control passes back to the block 900.

The radial and tangential portions for each receiver in the survey of the received seismic traces are isolated or discriminated in a block 930. This step may take place in processing, or may occur as described in FIG. 8.

The radial and tangential modes of operations of a seismic source are then determined in a block 940. The radial and tangential components for the seismic events are determined for each receiver, relative to the orientation of the particular receiver with respect to the seismic energy source, as in the embodiment detailed in FIG. 5.

In a block 950, the structure of the subsurface is determined based on the transformed seismic events and the transformed traces received at the receivers.

Figure 10:
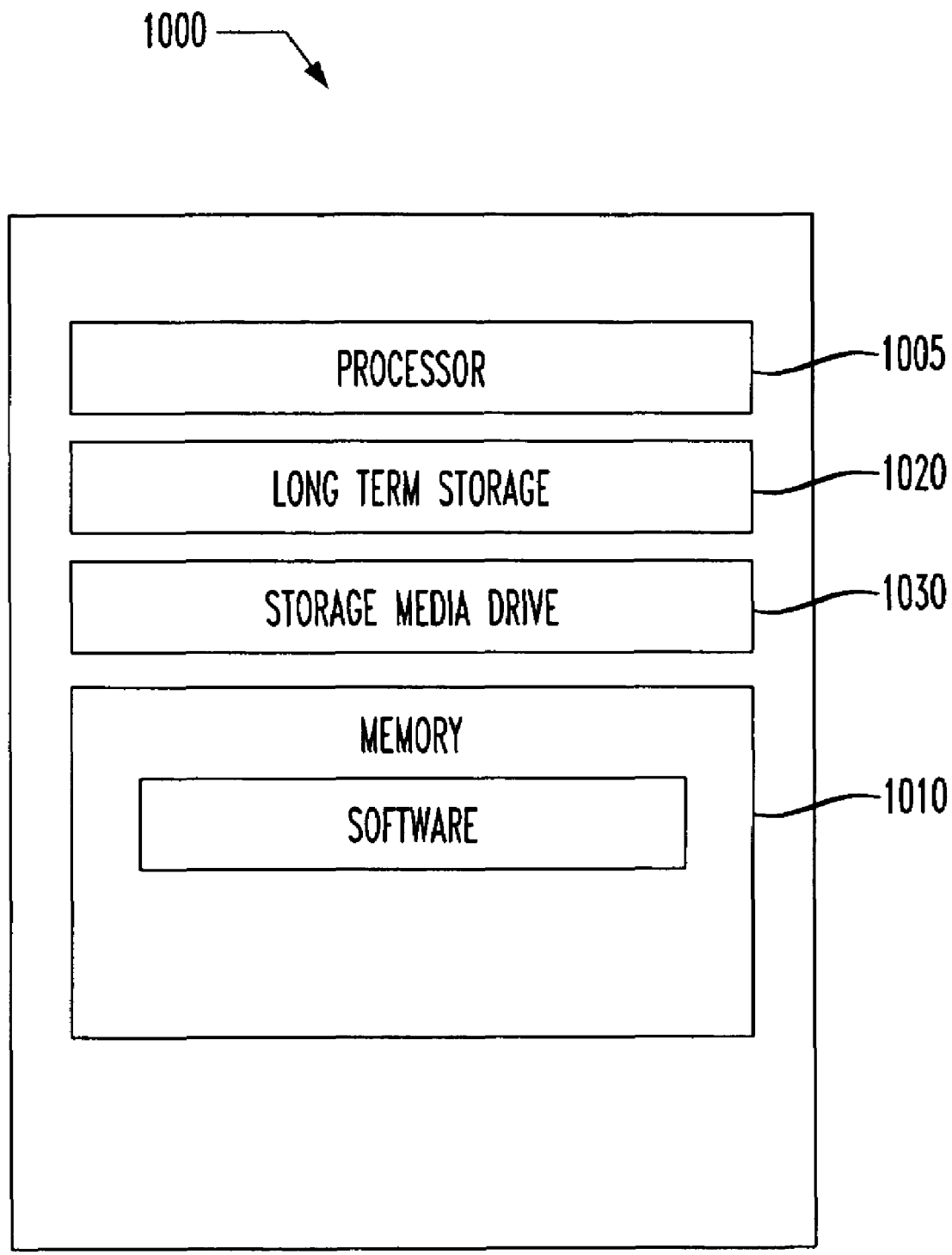
FIG. 10 is a block diagram of a computer system in which the invention of FIG. 4 may be practiced.

FIG. 10 is a block diagram of a computer system in which the invention of FIG. 4 may be practiced. A computer 1000 contains a processor 1005 and memory 1010. The computer 1000 may also contain a long-term storage device 1020. Additionally, the computer may contains a storage media drive 1030 from which a software program may be loaded into the memory 1010, or onto the long term storage device 1020, from which the software program may be loaded and run by the computing device. The processor would then execute the steps of a method to isolate or discriminate radial and tangential portions of seismic events as produced by a seismic energy source and as received by one or more seismic receivers. The computer could then become an instrument capable of isolating or discriminating the radial and tangential seismic energy.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method of geophysical exploration comprising:
    imparting a plurality of modes of seismic energy into the earth's subsurface formations with a seismic energy source, each imparting of a mode of seismic energy by the seismic energy source constituting a seismic event;
    detecting seismic energy from the seismic events with a plurality of seismic receivers, the seismic receivers adapted to detect seismic energy in at least two different orientations;
    recording seismic traces corresponding to the detected seismic energy;
    transforming the seismic energies produced by the seismic energy source to energies in a plurality of transformed modes; and
    determining a volumetric image of the subsurface formations based on the transformed seismic energies and the recorded seismic traces.

2. The method of claim 1 comprising transforming the reflected energies detected by the receivers into a plurality of seismic energies in a different coordinate system than that received.

3. The method of claim 2 wherein the seismic events detected by the receivers are transformed into modes of seismic energies corresponding to radial and tangential oriented seismic energies relative to an azimuth defined by a particular receiver detecting the seismic events and the seismic energy source.

4. The method of claim 1 wherein the step of imparting further comprises operating the seismic source in at least a first and a second directional mode.

5. The method of claim 4 wherein the at least a first and a second directional modes correspond to differently oriented types of seismic energy.

6. The method of claim 1 wherein the step of transforming further comprises rotating the seismic events to a radial and tangential, coordinate system with respect to an azimuth defined between any receiver detecting the seismic event and the seismic energy source.

7. The method of claim 1 wherein the step of determining is performed at least in part with any seismic event transformed to a radial and tangential coordinate system with respect to a receiver detecting the seismic event and the seismic energy source.

8. The method of claim 1 wherein the different orientations are orthogonal to one another.

9. A method of geophysical comprising:
    imparting seismic energy into a subsurface formation of the earth with a plurality of modes of seismic events from a seismic energy source;
    detecting each seismic event with at least one receiver, the at least one receiver adapted to detect seismic energy from a seismic event in a plurality of orientations;
    transforming the plurality of modes of seismic events produced by the seismic energy source to energies in plurality of transformed modes;
    discriminating a plurality of orientations of detected seismic energies from the detected seismic events;
    determining a volumetric image of the subsurface formations of the earth based on the transformed seismic events and the discriminated detected seismic energies.

* * * * *